US011157240B2

(12) United States Patent
Schwarz et al.

(10) Patent No.: US 11,157,240 B2
(45) Date of Patent: Oct. 26, 2021

(54) PERFORM CRYPTOGRAPHIC COMPUTATION SCALAR MULTIPLY INSTRUCTION

(71) Applicant: INTERNATIONAL BUSINESS MACHINES CORPORATION, Armonk, NY (US)

(72) Inventors: Eric M. Schwarz, Gardiner, NY (US); Jonathan D. Bradbury, Poughkeepsie, NY (US); Edward T. Malley, New Rochelle, NY (US); Christian Jacobi, West Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 293 days.

(21) Appl. No.: 16/276,689

(22) Filed: Feb. 15, 2019

(65) Prior Publication Data

US 2020/0264843 A1 Aug. 20, 2020

(51) Int. Cl.
*H04L 9/00* (2006.01)
*G06F 7/72* (2006.01)
*H04L 9/30* (2006.01)

(52) U.S. Cl.
CPC .............. *G06F 7/725* (2013.01); *H04L 9/003* (2013.01); *H04L 9/3066* (2013.01)

(58) Field of Classification Search
CPC ........ H04L 9/003; H04L 9/3066; G06F 7/725
See application file for complete search history.

(56) References Cited

U.S. PATENT DOCUMENTS

| 7,079,650 B1 | 7/2006 | Knudsen |
| 9,367,323 B2 | 6/2016 | Greiner et al. |
| 2008/0095357 A1 | 4/2008 | Kitamura et al. |
| 2010/0040335 A1 | 2/2010 | Venelli et al. |
| 2018/0062843 A1* | 3/2018 | Gopal .................. H04L 9/3066 |

OTHER PUBLICATIONS

ANSI X9.62-1998: Public Key Cryptography for the Financial Services Industry: the Elliptic Curve Digital Signature Algorithm (ECDSA), Sep. 30, 1998, Working Draft, pp. 1-128.
Arnold, T.W., et al., "IBM 4765 Cryptographic Coprocessor," IBM Journal of Research and Development, vol. 56, No. 1/2, Paper 10, Jan./Mar. 2012, pp. 10:1-10:13.

(Continued)

*Primary Examiner* — Beemnet W Dada
(74) *Attorney, Agent, or Firm* — Steven Chiu, Esq.; Blanche E. Schiller, Esq.; Heslin Rothenberg Farley & Mesiti P.C.

(57) ABSTRACT

A single architected instruction to perform scalar multiplication for cryptographic operations is obtained. The instruction is executed, and the executing includes determining a scalar multiply function of a plurality of scalar multiply functions supported by the instruction to be performed. Input for the scalar multiply function is obtained, and the input includes at least one source component and a scalar value. The scalar multiply function is performed using the input to provide an output to be used in a cryptographic operation.

20 Claims, 12 Drawing Sheets

(56) References Cited

OTHER PUBLICATIONS

Basu, Saikat, "A New Parallel Window-Based Implementation of the Elliptic Curve Point Multiplication in Multi-Core Architectures," International Journal of Network Security, vol. 14, No. 2, Mar. 2012, pp. 101-108.

Brown, M. et al., "Software Implementation of the NIST Elliptic Curves Over Prime Fields," Cryptographers' Track at the RSA Conference. Springer, Berlin, Heidelberg, Apr. 2001, pp. 1-21.

FIPS Pub 186-4, "Digital Signature Standard (DSS)," Federal Information Processing Standards Publication 186-4, Jul. 2013, pp. 1-130.

IBM, "z/Architecture—Principles of Operation," IBM Publication No. SA22-7832-11, Twelfth Edition, Sep. 2017, pp. 1-1902.

Izu, Tetsuya et al., "Fast elliptic curve multiplications resistant against side channel attacks." IEICE transactions on fundamentals of electronics, communications and computer sciences 88.1, Jan. 2005, pp. 161-171.

Le, H.Q., et al. "IBM POWER9 processor core." IBM Journal of Research and Development 62.4/5 Jul./Sep. 2018, pp. 2:1-2:12.

Mell, Peter and Tim Grance, "The NIST Definition of Cloud Computing," National Institute of Standards and Technology, Information Technology Laboratory, Special Publication 800-145, Sep. 2011, pp. 1-7.

Schaumont, P. et al., "A Reconfiguration Hierarchy for Elliptic Curve Cryptography," Conference Record of the $35^{th}$ Asilomar Conference on Signals, Systems and Computers, Nov. 2001, pp. 449-453.

Li Wei et al., "A High-Throughput Processor for Dual-Field Elliptic Curve Cryptography With Power Analysis Resistance," 2015 IEEE $12^{th}$ International Conference on Ubiquitous Intelligence and Computing et al., Aug. 2015, pp. 570-577.

Bernstein, Daniel J., "Analysis and Optimization of Elliptic-Curve Single-Scalar Multiplication," Cryptology ePrint Archive, Dec. 2007, pp. 1-19.

\* cited by examiner

| | Code | Function | Parm. Block Size (bytes) | Data Block Size (bytes) |
|---|---|---|---|---|
| 310 | 0 | PCC-Query | 16 | - |
| 312 | 1 | PCC-Compute-Last-Block-CMAC-Using-DEA | 32 | 8 |
| 314 | 2 | PCC-Compute-Last-Block-CMAC-Using-TDEA-128 | 40 | 8 |
| 316 | 3 | PCC-Compute-Last-Block-CMAC-Using-TDEA-192 | 48 | 8 |
| 318 | 9 | PCC-Compute-Last-Block-CMAC-Using-Encrypted-DEA | 56 | 8 |
| 320 | 10 | PCC-Compute-Last-Block-CMAC-Using-Encrypted-TDEA-128 | 64 | 8 |
| 322 | 11 | PCC-Compute-Last-Block-CMAC-Using-Encrypted-TDEA-192 | 72 | 8 |
| 324 | 18 | PCC-Compute-Last-Block-CMAC-Using-AES-128 | 56 | 16 |
| 326 | 19 | PCC-Compute-Last-Block-CMAC-Using-AES-192 | 64 | 16 |
| 328 | 20 | PCC-Compute-Last-Block-CMAC-Using-AES-256 | 72 | 16 |
| 330 | 26 | PCC-Compute-Last-Block-CMAC-Using-Encrypted-AES-128 | 88 | 16 |
| 332 | 27 | PCC-Compute-Last-Block-CMAC-Using-Encrypted-AES-192 | 96 | 16 |
| 334 | 28 | PCC-Compute-Last-Block-CMAC-Using-Encrypted-AES-256A | 104 | 16 |
| 336 | 50 | PCC-Compute-XTS-Parameter-Using-AES-128 | 80 | 16 |
| 338 | 52 | PCC-Compute-XTS-Parameter-Using-AES-256 | 96 | 16 |
| 340 | 58 | PCC-Compute-XTS-Parameter-Using-Encrypted-AES-128 | 112 | 16 |
| 342 | 60 | PCC-Compute-XTS-Parameter-Using-Encrypted-AES-256 | 128 | 16 |
| 344 | 64 | PCC-Scalar-Multiply-P256 | 1480 | - |
| 346 | 65 | PCC-Scalar-Multiply-P384 | 1560 | - |
| 348 | 66 | PCC-Scalar-Multiply-P521 | 1720 | - |
| 350 | 72 | PCC-Scalar-Multiply-Ed25519 | 1480 | - |
| 352 | 73 | PCC-Scalar-Multiply-Ed448 | 1640 | - |

| STATUS WORD |
|---|
| 402 |

FIG. 4A

PCC -SCALAR-MULTIPLY-P256 AND Ed25519    404

| OFFSET DEC | HEX | | |
|---|---|---|---|
| 00 | 00 | RESULT X COMPONENT (Xr) | 405 |
| 32 | 20 | RESULT Y COMPONENT (Yr) | 406 |
| 64 | 40 | SOURCE X COMPONENT (Xs) | 407 |
| 96 | 60 | SOURCE Y COMPONENT (Ys) | 408 |
| 128 | 80 | SCALAR (d) | 409 |
| 160 | A0 | RESERVED SAVE AREA | 410 |
| 1480 | 5C8 | | |

PCC -SCALAR-MULTIPLY- P384    412

| OFFSET DEC | HEX | | |
|---|---|---|---|
| 00 | 00 | RESULT X COMPONENT (Xr) | 413 |
| 48 | 30 | RESULT Y COMPONENT (Yr) | 414 |
| 96 | 60 | SOURCE X COMPONENT (Xs) | 415 |
| 144 | 90 | SOURCE Y COMPONENT (Ys) | 416 |
| 192 | C0 | SCALAR (d) | 417 |
| 240 | F0 | RESERVED SAVE AREA | 418 |
| 1560 | 618 | | |

PCC -SCALAR-MULTIPLY- P521

| OFFSET DEC | HEX | | |
|---|---|---|---|
| 00 | 00 | RESULT X COMPONENT (Xr) | 421 |
| 80 | 50 | RESULT Y COMPONENT (Yr) | 422 |
| 160 | A0 | SOURCE X COMPONENT (Xs) | 423 |
| 240 | F0 | SOURCE Y COMPONENT (Ys) | 424 |
| 320 | 140 | SCALAR (d) | |
| 400 | 190 | RESERVED SAVE AREA | 425 |
| 1720 | 6B8 | 0        32        63 | |

PCC -SCALAR-MULTIPLY- Ed448

| OFFSET DEC | HEX | | |
|---|---|---|---|
| 00 | 00 | RESULT X COMPONENT (Xr) | 427 |
| 64 | 40 | RESULT Y COMPONENT (Yr) | 428 |
| 128 | 80 | SOURCE X COMPONENT (Xs) | 429 |
| 192 | C0 | SOURCE Y COMPONENT (Ys) | 430 |
| 256 | 100 | SCALAR (d) | 431 |
| 320 | 140 | RESERVED SAVE AREA | 432 |
| 1640 | 668 | 0        32        63 | |

FIG. 4E

OBTAIN AN INSTRUCTION — 500

THE INSTRUCTION IS A SINGLE ARCHITECTED INSTRUCTION — 502

EXECUTE THE INSTRUCTION, THE EXECUTING INCLUDING — 504

DETERMINING A SCALAR MULTIPLY FUNCTION OF A PLURALITY OF SCALAR MULTIPLY FUNCTIONS SUPPORTED BY THE INSTRUCTION TO BE PERFORMED — 506

OBTAINING INPUT FOR THE SCALAR MULTIPLY FUNCTION TO BE PERFORMED, THE INPUT INCLUDING AT LEAST ONE SOURCE COMPONENT AND A SCALAR VALUE — 508

PERFORMING THE SCALAR MULTIPLY FUNCTION USING THE INPUT TO PROVIDE AN OUTPUT TO BE USED IN A CRYPTOGRAPHIC OPERATION — 510

THE PERFORMING THE SCALAR MULTIPLY FUNCTION INCLUDES PERFORMING SCALAR MULTIPLICATION OF A POINT ON AN ELLIPTIC CURVE, THE POINT SPECIFIED BY THE AT LEAST ONE SOURCE COMPONENT — 512

THE POINT ON THE ELLIPTIC CURVE IS SPECIFIED BY A FIRST SOURCE COMPONENT OF THE AT LEAST ONE SOURCE COMPONENT AND A SECOND SOURCE COMPONENT OF THE AT LEAST ONE SOURCE COMPONENT — 514

THE FIRST SOURCE COMPONENT AND THE SECOND SOURCE COMPONENT ARE INPUT TO THE INSTRUCTION VIA A PARAMETER BLOCK LOCATED USING A REGISTER ASSOCIATED WITH THE INSTRUCTION — 516

THE PERFORMING THE SCALAR MULTIPLY FUNCTION INCLUDES PERFORMING A SERIES OF POINT ADDITIONS AND POINT DOUBLINGS ALONG THE ELLIPTIC CURVE — 518

FIG. 5A

THE PERFORMING THE SCALAR MULTIPLY FUNCTION INCLUDES USING THE FOLLOWING EQUATION: (Xr, Yr) < = d * (Xs, Ys), IN WHICH Xs AND Ys ARE THE AT LEASE ONE SOURCE COMPONENT AND ARE COORDINATES OF A POINT ON AN ELLIPTIC CURVE, d IS THE SCALAR VALUE, * IS SCALAR MULTIPLY, AND Xr AND Yr ARE RESULTING COORDINATES OF THE SCALAR MULTIPLY FUNCTION, THE RESULTING COORDINATES BEING THE OUTPUT ~520 d INCLUDES A PLURALITY OF BITS WHICH ARE SCANNED FROM ONE BIT (e.g., A MOST SIGNIFICANT BIT OF d) TO ANOTHER BIT (e.g., A LEAST SIGNIFICANT BIT OF d) ~522

THE PERFORMING THE SCALAR MULTIPLY FUNCTION FURTHER INCLUDES FOR A BIT OF THE PLURALITY OF BITS OF d EQUAL TO A SELECT VALUE, A POINT ADDITION OCCURS, AND AFTER EACH BIT IS SCANNED, A POINT DOUBLING OCCURS ~524

THE PLURALITY OF SCALAR MULTIPLY FUNCTIONS INCLUDES A PLURALITY OF SCALAR MULTIPLY FUNCTIONS FOR A PLURALITY OF ELLIPTIC CURVE DIGITAL SIGNATURE ALGORITHM FUNCTIONS FOR A PLURALITY OF PRIMES ~526

THE PLURALITY OF SCALAR MULTIPLY FUNCTIONS INCLUDES A PLURALITY OF SCALAR MULTIPLY FUNCTIONS FOR A PLURALITY OF EDWARDS-CURVE DIGITAL SIGNATURE ALGORITHM FUNCTIONS FOR A PLURALITY OF PRIMES ~528

FIG. 5B

PERFORM CRYPTOGRAPHIC COMPUTATION SCALAR MULTIPLY INSTRUCTION

BACKGROUND

One or more aspects relate, in general, to facilitating processing within a computing environment, and in particular, to facilitating performing cryptographic operations within the computing environment.

Cryptography is used to provide secure communications within computing environments, including the secure transmission of messages. Cryptography includes encrypting messages such that only authorized parties can read the transmitted messages. For example, during encryption, a message in plaintext is encoded using an encryption technique to provide an encrypted message or cipher text. The encrypted message is sent to an authorized recipient. The recipient receives the encrypted message and decrypts it using the same encryption technique to provide the plaintext of the message.

There are a number of encryption techniques that may be used, including those that are based on elliptic curves. Such encryption techniques include, for instance, the Elliptic Curve Signature Algorithm (ECDSA) and the Edwards-curve Digital Signature Algorithm (EdDSA). In performing cryptography using these techniques, a common, computationally intense operation that is performed is the scalar multiply operation.

SUMMARY

Shortcomings of the prior art are overcome and additional advantages are provided through the provision of a computer program product for facilitating processing within a computing environment. The computer program product includes a computer readable storage medium readable by a processing circuit and storing instructions for performing a method. The method includes obtaining an instruction, the instruction being a single architected instruction. The instruction is executed, and the executing includes determining a scalar multiply function of a plurality of scalar multiply functions supported by the instruction to be performed. Input for the scalar multiply function to be performed is obtained, and the input includes at least one source component and a scalar value. The scalar multiply function is performed using the input to provide an output to be used in a cryptographic operation.

By using a single architected instruction to perform a scalar multiply function, a significant subset of primitive software instructions to perform that function is replaced by the single architected instruction. The replacement of those primitive instructions with a single architected instruction reduces program complexity and eliminates the need to include code to optimize the primitive instructions. Overall performance is improved. Further, registers and memory are not needed to be allocated to save intermediate results thus, freeing up resources for other concurrent operations.

In one example, the performing the scalar multiply function includes performing scalar multiplication of a point on an elliptic curve. The point is specified by the at least one source component. As an example, the point on the elliptic curve is specified by a first source component of the at least one source component and a second source component of the at least one source component. The first source component and the second source component are, for instance, input to the instruction via a parameter block located using a register associated with the instruction.

The performing the scalar multiply function includes, for instance, performing a series of point additions and point doublings along the elliptic curve.

In one example, the performing the scalar multiply function includes using the following equation: $(Xr, Yr) <= d* (Xs, Ys)$, wherein Xs and Ys are the at least one source component and are coordinates of a point on an elliptic curve, d is the scalar value, * is scalar multiply, and Xr and Yr are resulting coordinates of the scalar multiply function, the resulting coordinates being the output.

As an example, d includes a plurality of bits which are scanned from one bit (e.g., a most significant bit of d) to another bit (e.g., a least significant bit of d), and in one example, the performing the scalar multiply function further includes for a bit of the plurality of bits of d equal to a select value, a point addition occurs, and after each bit is scanned, a point doubling occurs.

In one example, the plurality of scalar multiply functions includes a plurality of scalar multiply functions for a plurality of elliptic curve digital signature algorithm functions for a plurality of primes. As another example, the plurality of scalar multiply functions includes a plurality of scalar multiply functions for a plurality of Edwards-curve digital signature algorithm functions for a plurality of primes.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3C depicts one example of function codes supported by the instruction, in accordance with an aspect of the present invention;

FIGS. 4A-4E depict examples of contents of parameter blocks used by various functions of the Perform Cryptographic Computation instruction, in accordance with an aspect of the present invention;

FIGS. 5A-5B depict one example of facilitating processing within a computing environment, in accordance with an aspect of the present invention;

DETAILED DESCRIPTION

In accordance with an aspect of the present invention, a capability is provided to facilitate processing within a computing environment. As one example, a single instruction (e.g., a single architected hardware machine instruction at the hardware/software interface) is provided to perform an operation, such as a perform cryptographic computation operation, that facilitates performance of scalar multiply operations for cryptographic operations. The instruction is part of a general-purpose processor instruction set architecture (ISA), which is dispatched by a program (e.g., an operating system or a user program) on a processor, such as a general-purpose processor.

In one example, the instruction, referred to as a Perform Cryptographic Computation (PCC) instruction, is used to perform scalar multiply functions for, e.g., cryptographic operations. The instruction is, for instance, part of a Message Security Assist Extension (e.g., Message Security Assist Extension 9) facility of the z/Architecture® hardware architecture, offered by International Business Machines Corporation, Armonk, N.Y. The Message Security Assist Extension provides support for elliptical curve cryptography authentication of a message, generation of elliptical curve keys and scalar multiplication.

Figure 1A:
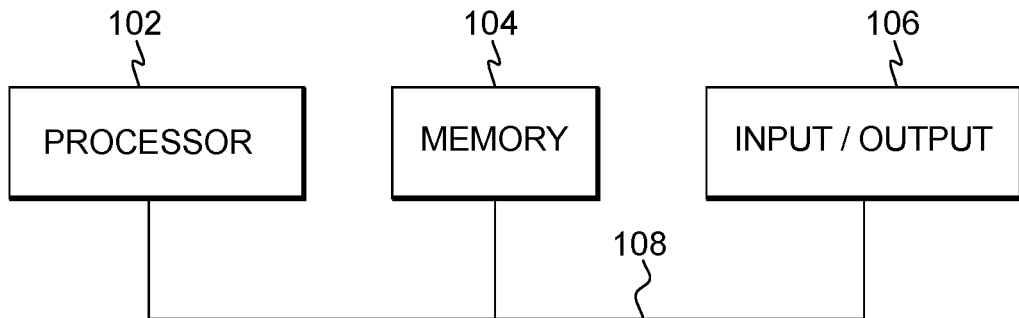
FIG. 1A depicts one example of a computing environment to incorporate and use one or more aspects of the present invention.

One embodiment of a computing environment to incorporate and use one or more aspects of the present invention is described with reference to FIG. 1A. A computing environment 100 includes, for instance, a processor 102 (e.g., a central processing unit), a memory 104 (e.g., main memory; a.k.a., system memory, main storage, central storage, storage), and one or more input/output (I/O) devices and/or interfaces 106 coupled to one another via, for example, one or more buses 108 and/or other connections.

In one example, processor 102 is based on the z/Architecture hardware architecture offered by International Business Machines Corporation, Armonk, N.Y., and is part of a server, such as an IBM Z° server, which is also offered by International Business Machines Corporation and implements the z/Architecture hardware architecture. One embodiment of the z/Architecture hardware architecture is described in a publication entitled, "z/Architecture Principles of Operation," IBM Publication No. SA22-7832-11, 12$^{th}$ edition, September 2017, which is hereby incorporated herein by reference in its entirety. The z/Architecture hardware architecture, however, is only one example architecture; other architectures and/or other types of computing environments may include and/or use one or more aspects of the present invention. In one example, the processor executes an operating system, such as the z/OS® operating system, also offered by International Business Machines Corporation.

Figure 1B:
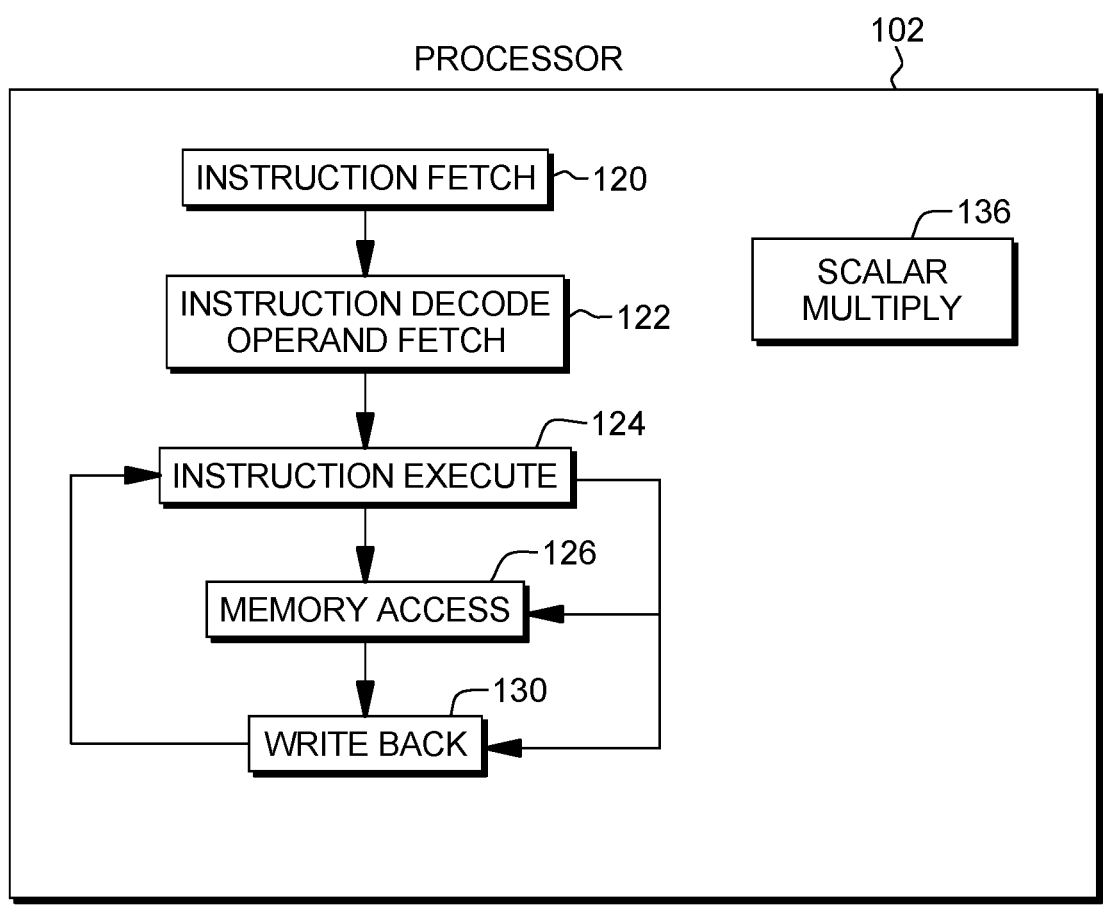
FIG. 1B depicts further details of a processor of FIG. 1A, in accordance with one or more aspects of the present invention.

Processor 102 includes a plurality of functional components used to execute instructions. As depicted in FIG. 1B, these functional components include, for instance, an instruction fetch component 120 to fetch instructions to be executed; an instruction decode unit 122 to decode the fetched instructions and to obtain operands of the decoded instructions; an instruction execute component 124 to execute the decoded instructions; a memory access component 126 to access memory for instruction execution, if necessary; and a write back component 130 to provide the results of the executed instructions. One or more of these components may, in accordance with one or more aspects of the present invention, include at least a portion of or have access to one or more other components used in scalar multiplication processing (or other processing that may use one or more aspects of the present invention), such as scalar multiplication processing for cryptographic operations. The one or more other components include, for instance, a scalar multiply component (or other component) 136.

Another example of a computing environment to incorporate and use one or more aspects of the present invention is described with reference to FIG. 2. In one example, the computing environment is based on the z/Architecture hardware architecture; however, the computing environment may be based on other architectures offered by International Business Machines Corporation or others.

Figure 2:
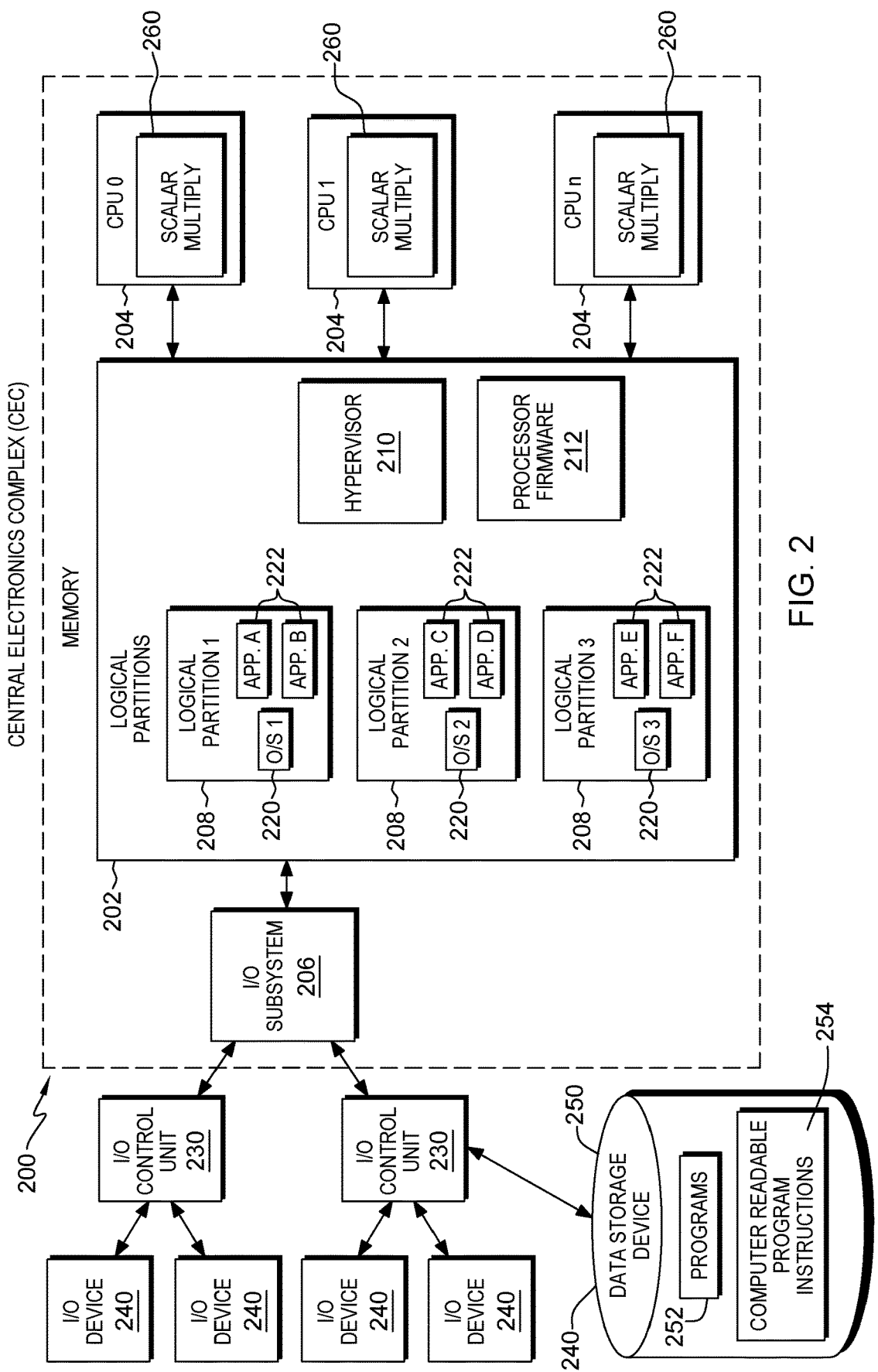
FIG. 2 depicts another example of a computing environment to incorporate and use one or more aspects of the present invention.

Referring to FIG. 2, in one example, the computing environment includes a central electronics complex (CEC) 200. CEC 200 includes a plurality of components, such as, for instance, a memory 202 (a.k.a., system memory, main memory, main storage, central storage, storage) coupled to one or more processors (a.k.a., central processing units (CPUs)) 204, and to an input/output subsystem 206.

Memory 202 includes, for example, one or more logical partitions 208, a hypervisor 210 that manages the logical partitions, and processor firmware 212. One example of hypervisor 210 is the Processor Resource/System Manager (PR/SM') hypervisor, offered by International Business Machines Corporation, Armonk, N.Y. As used herein, firmware includes, e.g., the microcode of the processor. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware.

Each logical partition 208 is capable of functioning as a separate system. That is, each logical partition can be independently reset, run a guest operating system 220 such as a z/OS operating system, or another operating system, and operate with different programs 222. An operating system or application program running in a logical partition appears to have access to a full and complete system, but in reality, only a portion of it is available.

Memory 202 is coupled to processors (e.g., CPUs) 204, which are physical processor resources that may be allocated to the logical partitions. For instance, a logical partition 208 includes one or more logical processors, each of which represents all or a share of a physical processor resource 204 that may be dynamically allocated to the logical partition.

Further, memory 202 is coupled to I/O subsystem 206. I/O subsystem 206 may be a part of the central electronics complex or separate therefrom. It directs the flow of information between main storage 202 and input/output control units 230 and input/output (I/O) devices 240 coupled to the central electronics complex.

Many types of I/O devices may be used. One particular type is a data storage device 250. Data storage device 250 may store one or more programs 252, one or more computer readable program instructions 254, and/or data, etc. The computer readable program instructions may be configured to carry out functions of embodiments of aspects of the invention.

As one example, each processor 204 includes and/or has access to a scalar multiply component (or other component) 260 used in performing scalar multiplication (and/or other operations of one or more aspects of the present invention) for, e.g., cryptographic operations. In various examples, there may be one or more components performing these tasks. Many variations are possible.

Central electronics complex 200 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 200. Examples include, but are not limited to: microcode, device drivers, redundant processing units, external disk drive arrays, RAID systems, tape drives, and data archival storage systems, etc.

Further, central electronics complex 200 may be operational with numerous other general purpose or special purpose computing system environments or configurations. Examples of well-known computing systems, environments, and/or configurations that may be suitable for use with central electronics complex 200 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Although various examples of computing environments are described herein, one or more aspects of the present invention may be used with many types of environments. The computing environments provided herein are only examples.

In accordance with an aspect of the present invention, a computing environment, such as computing environment 100 or central electronics complex 200, employs a Message Security Assist Extension facility that provides a mechanism to perform scalar multiply operations for, e.g., elliptic curve cryptographic operations. In one example, the facility is installed in the system when a facility indicator is set, e.g., to one. As one particular example of the z/Architecture hardware architecture, facility bit 155 is set to, e.g., one, when the facility is installed in the z/Architecture architectural mode. The facility includes, for instance, the Perform Cryptographic Computation instruction, an embodiment of which is described below.

One embodiment of the Perform Cryptographic Computation instruction is described with reference to FIGS. 3A-3D. The instruction is executed, in one example, using a processor, such as a general-purpose processor (e.g., processor 102 or 204). In the description herein, specific locations, specific fields and/or specific sizes of the fields are indicated (e.g., specific bytes and/or bits). However, other locations, fields and/or sizes may be provided. Further, although the setting of a bit to a particular value, e.g., one or zero, is specified, this is only an example. The bit may be set to a different value, such as the opposite value or to another value, in other examples. Many variations are possible.

Figure 3A:
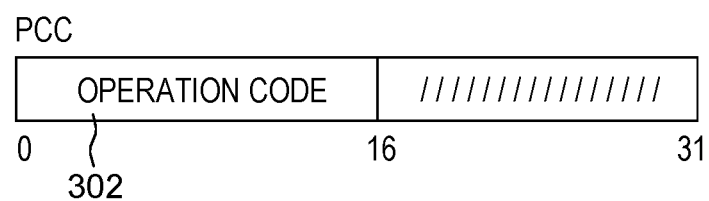
FIG. 3A depicts one format of a Perform Cryptographic Computation (PCC) instruction, in accordance with an aspect of the present invention.

Referring to FIG. 3A, in one example, a format of a Perform Cryptographic Computation (PCC) instruction 300 is an RRE format that denotes a register and register operation with an extended operation code (opcode) field. As an example, the instruction includes an operation code field 302 (e.g., bits 0-15) having an operation code indicating a perform cryptographic computation operation. In one example, bits 16-31 of the instruction are ignored.

In one embodiment, execution of the instruction includes the use of one or more implied general registers (i.e., registers not explicitly designated by the instruction). For instance, general registers 0 and 1 are used in execution of the instruction, as described herein. In one example, general register 0 contains various controls affecting the operation of the instruction, and general register 1 is used to provide a location of a parameter block used by the instruction.

Figure 3B:
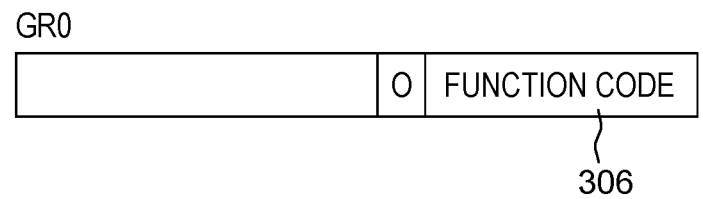
FIG. 3B depicts one example of a field of an implied register, general register 0, used by the instruction, in accordance with an aspect of the present invention.

As an example, with reference to FIG. 3B, a general register 0 (304) includes a function code field 306 that includes a function code. In one particular example, bit positions 57-63 of general register 0 contain the function code; but in other embodiments, other bits may be used to contain the function code. Further, in one example, bit 56 of general register 0 is to be zero; otherwise, a specification exception is recognized. All other bits of general register 0 are ignored, in this example.

Example assigned function codes for the Perform Cryptographic Computation instruction are shown in FIG. 3C and include, for instance: function code 0 (310) indicating a PCC-Query function; function code 1 (312) indicating a PCC-Compute-Last-Block-CMAC-Using-DEA function; function code 2 (314) indicating a PCC-Compute-Last-Block-CMAC-Using-TDEA-128 function; function code 3 (316) indicating a PCC-Compute-Last-Block-CMAC-Using-TDEA-192 function; function code 9 (318) indicating a PCC-Compute-Last-Block-CMAC-Using-Encrypted-DEA function; function code 10 (320) indicating a PCC-Compute-Last-Block-CMAC-Using-Encrypted-TDEA-128 function; function code 11 (322) indicating a PCC-Compute-Last-Block-CMAC-Using-Encryted-TDEA-192 function; function code 18 (324) indicating a PCC-Compute-Last-Block-CMAC-Using-AES-128 function; function code 19 (326) indicating a PCC-Compute-Last-Block-CMAC-Using-AES-192 function; function code 20 (328) indicating a PCC-Compute-Last-Block-CMAC-Using-AES-256 function; function code 26 (330) indicating a PCC-Compute-Last-Block-CMAC-Using-Encrypted-AES-128 function; function code 27 (332) indicating a PCC-Compute-Last-Block-CMAC-Using-Encrypted-AES-192 function; function code 28 (334) indicating a PCC-Compute-Last-Block-CMAC-Using-Encrypted-AES-256A function; function code 50 (336) indicating a PCC-Compute-XTS-Parameter-Using-AES-128 function; function code 52 (338) indicating a PCC-Compute-XTS-Parameter-Using-AES-256 function; function code 58 (340) indicating a PCC-Compute-XTS-Parameter-Using-Encrypted-AES-128 function; function code 60 (342) indicating a PCC-Compute-XTS-Parameter-Using-Encrypted-AES-256 function; function code 64 (344) indicating a PCC-Scalar-Multiply-P256 function; function code 65 (346) indicating a PCC-Scalar-Multiply-P384 function; function code 66 (348) indicating a PCC-Scalar-Multiply-P521 function; function code 72 (350) indicating a PCC-Scalar-Multiply-Ed25519 function; and function code 73 (352) indicating a PCC-Scalar-Multiply-Ed448 function.

Each function uses a parameter block and the size of the parameter block depends, in one example, on the function. Example parameter block sizes for the functions are depicted in FIG. 3C, as well as example data block sizes, if applicable. Other function codes are unassigned in this example. Although example functions and function codes are described, other functions and/or function codes may be used.

As indicated, each function uses a parameter block. A parameter block is specified by, for instance, general register 1. In one example, referring to FIG. 3D, the contents of general register 1 (350) specify, for instance, a logical address 352 of the leftmost byte of a parameter block in storage. For instance, in the 24-bit addressing mode, the contents of bit positions 40-63 of general register 1 constitute the address, and the contents of bit positions 0-39 are ignored. In the 31-bit addressing mode, the contents of bit positions 33-63 of general register 1 constitute the address, and the contents of bit positions 0-32 are ignored. In the 64-bit addressing mode, the contents of bit positions 0-63 of general register 1 constitute the address. In the access register mode, access register 1 specifies the address space containing the parameter block. Additional details regarding the parameter block for various functions supported by the instruction, in accordance with an aspect of the present invention, are described further below.

As observed by this CPU, other CPUs, and channel programs, reference to the parameter block may be multiple-access references, accesses to these storage locations are not necessarily block concurrent, and the sequence of these accesses or references is undefined.

As indicated, the Perform Cryptographic Computation instruction supports a plurality of functions. In execution of the instruction, a function specified by the function code in general register 0 is performed. Some of the functions supported by the instruction, including those provided in accordance with one or more aspects of the present invention, are described below:

PCC-Query (Function Code 0)

Figure 3D:
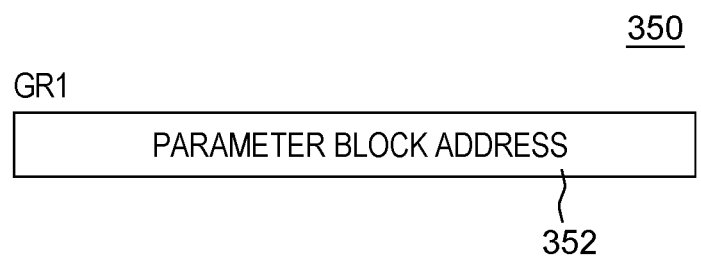
FIG. 3D depicts one example of a field of another implied register, general register 1, used by the instruction, in accordance with an aspect of the present invention.

The query function provides a mechanism indicating the availability of the other functions. The locations of the operands and addresses used by the instruction are as shown in FIGS. 3B and 3D.

One example of a parameter block used by the query function is described with reference to FIG. 4A. As shown, in one example, a parameter block 400 includes, for instance, a 128-bit status word 402. Bits 0-127 of this field correspond to function codes 0-127, respectively, of the PCC instruction. When a bit is, e.g., one, the corresponding function is installed; otherwise, the function is not installed.

In one example, condition code 0 is set when execution of the PCC-Query function completes; condition codes 1, 2, and 3 are not applicable to this function.

PCC-Scalar-Multiply (Function Codes 64, 65, 66, 72 and 73)

In one embodiment, five PCC-Scalar-Multiply functions are supported, and the corresponding function codes are provided below:

PCC-Scalar-Multiply-P256 (Function Code 64)
PCC-Scalar-Multiply-P384 (Function Code 65)
PCC-Scalar-Multiply-P521 (Function Code 66)
PCC-Scalar-Multiply-Ed25519 (Function Code 72)
PCC-Scalar-Multiply-Ed448 (Function Code 73)

Three of the functions, PCC-Scalar-Multiply-P256, PCC-Scalar-Multiply-P384, and PCC-Scalar-Multiply-P521, use the ECDSA technique for selected National Institute of Standards and Technology (NIST) primes (e.g., P256, P384, P521). The other two functions, PCC-Scalar-Multiply-Ed25519 and PCC-Scalar-Multiply-Ed448, use the EdDSA technique for selected primes (e.g., Ed25519, Ed448).

In one example, in execution of a PCC-Scalar-Multiply function, the function implements a scalar multiply of a point on an elliptic curve as shown by the following, in one example:

$$(Xr, Yr) \mathrel{<}= d * (Xs, Ys)$$

where the input point represented by the coordinates, Xs and Ys, is multiplied by a scalar, d, which results in the point represented by the coordinates Xr and Yr. The scalar multiply of a point can be accomplished by a series of point additions and point doublings along the elliptic curve. The bits of d are scanned, for instance, from most significant to least significant. In one example, every bit equal to one in the scalar, d, a point addition occurs, and after each bit scanned, a point doubling occurs. By a series of point additions and point doublings, the overall scalar multiply is performed.

To further explain, in one example, a scalar or integer multiplies a point on an elliptic curve which is defined over a finite field. The scalar is scanned, e.g., from most significant bit to least significant bit, and if the scalar's bit is a one, then the point is added to the current summation point, and after scanning each bit, the summation point is doubled. The summation point resulting from point addition is defined as negation of the point resulting from the intersection with the elliptic curve of a straight line through the two points being added. Point doubling is similar, but the straight line through the same point is not well-defined, so actually the tangent line to the elliptic curve at that point is used, and the summation point is the negative point where the tangent line intersects the elliptic curve. There are mathematical shortcuts to determine the resulting X and Y coordinates of the summation point without drawing graphs of the elliptic curve. The mathematical formulas for point doubling and point addition are dependent, e.g., on the elliptic curve.

As indicated, operands for the scalar multiply functions are provided via parameter blocks, examples of which are described below. Additional details for the fields of the parameter blocks are described subsequent to describing the parameter blocks for the various functions.

One example of a parameter block for the PCC-Scalar-Multiply-P256 function and the PCC-Scalar-Multiply-Ed25519 function is described with reference to FIG. 4B. In one example, a parameter block 404 includes, for instance, a Result X component (Xr) 405, a Result Y component (Yr) 406, a source X component (Xs) 407, a Source Y component (Ys) 408, a Scalar (d) 409, and a reserved save area 410. Example offsets within the parameter block are depicted in FIG. 4B.

Further, one example of a parameter block for the PCC-Scalar-Multiply-P384 function is described with reference to FIG. 4C. In one example, a parameter block 412 includes, for instance, a Result X component (Xr) 413, a Result Y component (Yr) 414, a source X component (Xs) 415, a Source Y component (Ys) 416, a Scalar (d) 417, and a reserved save area 418. Example offsets within the parameter block are depicted in FIG. 4C.

Yet further, referring to FIG. 4D, a parameter block 420 for the PCC-Scalar-Multiply-P521 function includes, for instance, a Result X component (Xr) 421, a Result Y component (Yr) 422, a source X component (Xs) 423, a Source Y component (Ys) 424, a Scalar (d), and a reserved save area 425. Example offsets within the parameter block are depicted in FIG. 4D.

Similarly, referring to FIG. 4E, a parameter block 426 for the PCC-Scalar-Multiply-Ed448 function includes, for instance, a Result X component (Xr) 427, a Result Y component (Yr) 428, a source X component (Xs) 429, a Source Y component (Ys) 430, a Scalar (d) 431, and a reserved save area 432. Example offsets within the parameter block are depicted in FIG. 4E.

Further details of the fields of the parameter blocks for the various PCC-Scalar-Multiply functions are described below. In one example:

Result X component (Xr): This is the X component of the point on the elliptic curve resulting from the multiply of scalar times the source point on the curve. It is, for instance, an integer greater than or equal to zero and less than the prime of the function and right-aligned in this field. Part of the result of the PCC-Scalar-Multiply function is stored to this field in the parameter block.

Result Y component (Yr): This is the Y component of the point on the elliptic curve resulting from the multiply of scalar times the source point on the curve. It is, for instance, an integer greater than or equal to zero and less than the prime of the function and is right-aligned in this field. Part of the result of the PCC-Scalar-Multiply function is stored to this field in the parameter block.

Source X component (Xs): This is the X component of the point on the elliptic curve which is the source of the scalar multiply. Xs is right-aligned in this field and bytes to the left are ignored. Xs is, for instance, an integer greater than or equal to zero and less than the prime of the function. If it is greater than the prime, a condition code equal to one is reported.

Source Y component (Ys): This is the Y component of the point on the elliptic curve which is the source of the scalar multiply. Ys is right-aligned in this field and bytes to the left are ignored and can be random values. Ys is, for instance, an integer greater than or equal to zero and less than the prime of the function. If it is greater than the prime, a condition code equal to one is reported.

Scalar (d): This is the source integer scalar to the PCC-Scalar-Multiply function. d is right-aligned in this field and bytes to the left are ignored and can be random values. d is, for instance, an integer greater than or equal to zero and less than the order of the curve, which is less than the prime. If d is not in this range, a condition code equal to one is reported. The order of the curve is, e.g., a parameter value associated with the curve, provided in a standard for the curve (e.g., FIPS PUB 186-4, Federal Information Processing Standards Publication, Digital Signature Standard (DSS), issued July 2013; Edwards-Curve Digital Signature Algorithm (EdDSA), Internet Research Task Force (IRTF), RFC-8032, January 2017).

Reserved Save Area: The reserved save area is a predefined amount of memory to be used to save state information to be used, e.g., if the instruction ends in partial completion, allowing the instruction to be restarted at the point of partial completion.

Store-type access exceptions may be recognized for any location in the parameter block, even though only the Xr and Yr fields are actually stored by the instruction.

In one embodiment, if Xs and Ys are not on the specified curve, or any of them are greater than the prime modulus, or if d is not greater than zero and less than the order of the curve, a condition code equal to one is reported and the result is not updated.

Example Conditions:

A specification exception is recognized, and no other action is taken if any of the following occurs, in one example:
1. Bit 56 of general register 0 is not zero.
2. Bits 57-63 of general register 0 specify an unassigned or uninstalled function code.

Example Resulting Condition Codes:
0 Normal completion
1 Verification-pattern mismatch or source operand out of range or not on curve
2 Invalid bit index or message length
3 Partial completion Example Program Exceptions:
Access (fetch, parameter block; fetch and store, intermediate bit index, XTS parameter, initial chaining value)
Operation (if the message-security-assist extension 4 is not installed)
Specification
Transaction constraint Example priority of execution for PCC includes, for instance:
1.-6. Exceptions with the same priority as the priority of program interruption conditions for the general case.
7.A Access exceptions for second instruction halfword.
7.B Operation exception.
7.0 Transaction constraint.
8. Specification exception due to invalid function code or invalid register number.
9. Condition code 0 due to message length originally zero.
11.A Condition code 1 due to verification pattern mismatch.
11.B. Condition code 2 due to invalid bit index or message length.
12. Condition code 0 due to normal completion (message length originally non-zero, but stepped to zero.
13. Condition code 3 due to partial completion (message length still non-zero).

Programming Note:

If the program is to frequently test for the availability of a function, it should perform the query function once during initialization; subsequently, it should examine the stored results of the query function in memory with an instruction such as, for instance, Test Under Mask.

As described herein, in one aspect, a single instruction (e.g., a single architected machine instruction at the hardware/software interface, e.g., Perform Cryptographic Computation instruction) is provided to perform scalar multiply functions, e.g., for use in cryptographic operations, using, e.g., a general-purpose processor. This instruction is, for instance, a hardware instruction defined in an Instruction Set Architecture (ISA). As a result, the complexity of the program related to scalar multiply functions is reduced. Further, performance of the functions, and thus, the processor, is improved. Compared to a software implementation, executing the single instruction requires significantly fewer execution cycles to perform the same operation.

As an example, scalar multiplication is used to create a public key from a private key. The private key is a prime scalar and it is multiplied by a generator point to give the public key, which is a point. As other examples, scalar multiplication is used to generate a digital signature to be used in signing messages and/or in verifying digital signatures. By performing these functions in hardware, there is more security and the implementation timing is independent of the inputs.

Although various fields and registers of the Perform Cryptographic Computation instruction are described, one or more aspects of the present invention may use other, additional or fewer fields or registers, or other sizes of fields and registers, etc. Many variations are possible. For instance, implied registers may be used instead of explicitly specified registers or fields of the instruction and/or explicitly specified registers or fields may be used instead of implied registers or fields. Other variations are also possible.

One or more aspects of the present invention are inextricably tied to computer technology and facilitate processing within a computer, improving performance thereof. The use of a single architected machine instruction to perform scalar multiplication for cryptographic operations improves performance within the computing environment. The cryptographic operations are used, for instance, to sign/verify messages and/or in other encryption/decryption operations. The scalar multiplication and/or the messages protected using the cryptographic operations may be used in many technical fields, such as in computer processing, medical processing, security, etc. By providing optimizations in performing scalar multiplication for, e.g., cryptographic operations, these technical fields are improved by reducing execution time.

Further details of one embodiment of facilitating processing within a computing environment, as it relates to one or more aspects of the present invention, are described with reference to FIGS. 5A-5B.

Referring to FIG. 5A, an instruction (e.g., Perform Cryptographic Computation) is obtained (500), which is a single architected instruction (502). The instruction is executed (504) by, e.g., hardware of a processor (e.g., processor 102 or 204). The hardware may be within the processor or coupled thereto for purposes of receiving the instruction from the processor, which, e.g., obtains, decodes and sets-up the instruction to execute on the hardware. Other variations are possible.

The executing includes, for instance, determining a scalar multiply function of a plurality of scalar multiply functions supported by the instruction to be performed (506). In one example, this is determined from the function code specified in, e.g., general register 0, and input to the instruction. Input for the scalar multiply function to be performed is obtained, and the input includes at least one source component and a scalar value (508). The scalar multiply function is performed using the input to provide an output to be used in a cryptographic operation (510).

In one example, the performing the scalar multiply function includes performing scalar multiplication of a point on an elliptic curve, the point being specified by the at least one source component (512). As an example, the point on the elliptic curve is specified by a first source component (e.g., Xs) of the at least one source component and a second source component (e.g., Ys) of the at least one source component (514). The first source component and the second source component are, for instance, input to the instruction via a parameter block located using a register (e.g., general register 1) associated with the instruction (516).

The performing the scalar multiply function includes, for instance, performing a series of point additions and point doublings along the elliptic curve (518).

In one example, referring to FIG. 5B, the performing the scalar multiply function includes using the following equation: $(Xr, Yr) \mathrel{<}{=} d*(Xs, Ys)$, in which Xs and Ys are the at least one source component and are coordinates of a point on an elliptic curve, d is the scalar value, * is scalar multiply, and Xr and Yr are resulting coordinates of the scalar multiply function, the resulting coordinates being the output (520). The output (e.g., Xr, Yr) is stored to the parameter block corresponding to the function code. d includes, for instance, a plurality of bits which are scanned from one bit (e.g., a most significant bit of d) to another bit (e.g., a least significant bit of d) (522). The performing the scalar multiply function further includes, in one example, for a bit of the plurality of bits of d equal to a select value, a point addition occurs, and after each bit is scanned, a point doubling occurs (524).

As an example, the plurality of scalar multiply functions includes a plurality of scalar multiply functions for a plurality of elliptic curve digital signature algorithm functions for a plurality of primes (526). As another example, the plurality of scalar multiply functions includes a plurality of scalar multiply functions for a plurality of Edwards-curve digital signature algorithm functions for a plurality of primes (528).

Other variations and embodiments are possible.

Figure 6A:
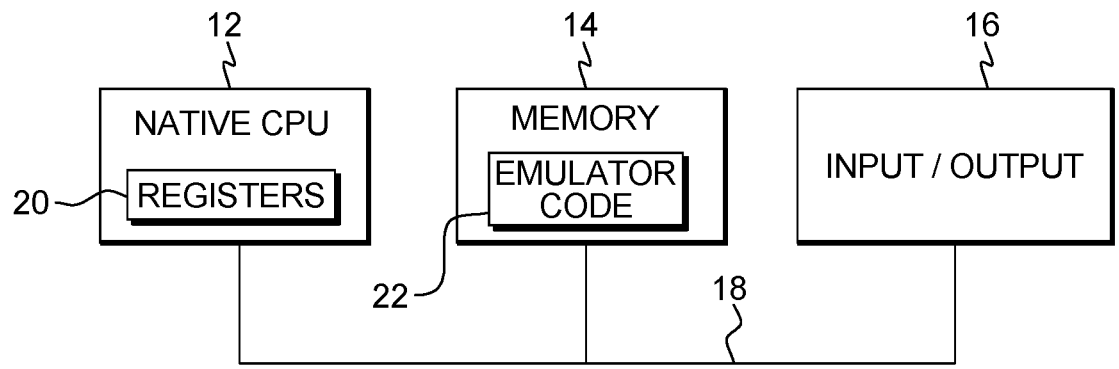
FIG. 6A depicts another example of a computing environment to incorporate and use one or more aspects of the present invention.

Aspects of the present invention may be used by many types of computing environments. Another embodiment of a computing environment to incorporate and use one or more aspects of the present invention is described with reference to FIG. 6A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include a PowerPC® processor offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel Corporation, Oracle, or others. IBM, z/Architecture, IBM Z, z/OS, PR/SM and PowerPC are trademarks or registered trademarks of International Business Machines Corporation in at least one jurisdiction. Intel and Itanium are trademarks or registered trademarks of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 6B:
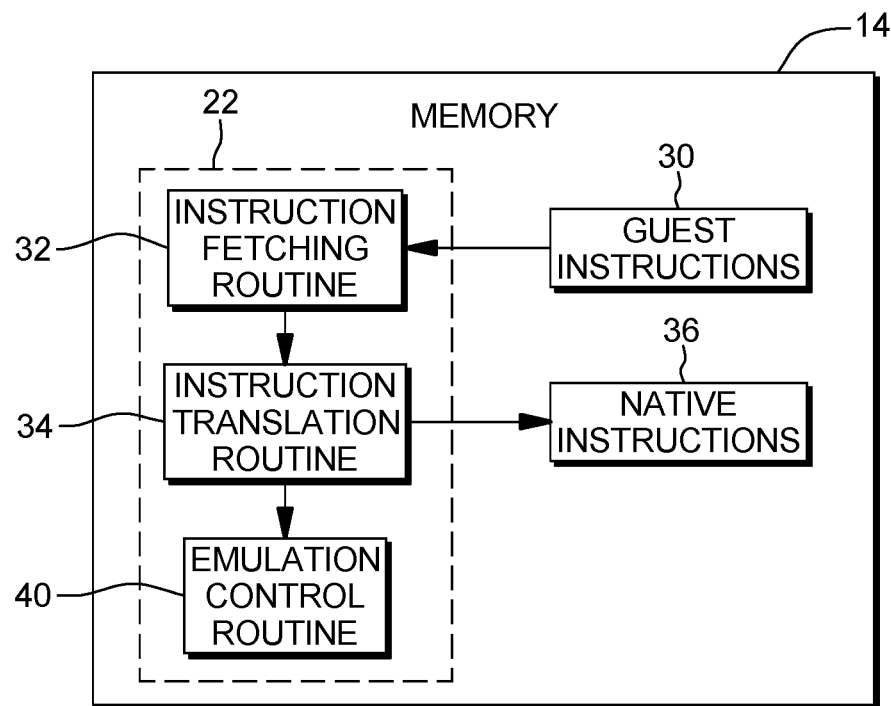
FIG. 6B depicts further details of the memory of FIG. 6A.

Further details relating to emulator code 22 are described with reference to FIG. 6B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture hardware architecture, but instead, are being emulated on native CPU 12, which may be, for example, an Intel Itanium II processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Each computing environment is capable of being configured to include one or more aspects of the present invention. For instance, each may be configured to provide scalar multiplication for use, e.g., in cryptographic operations, in accordance with one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
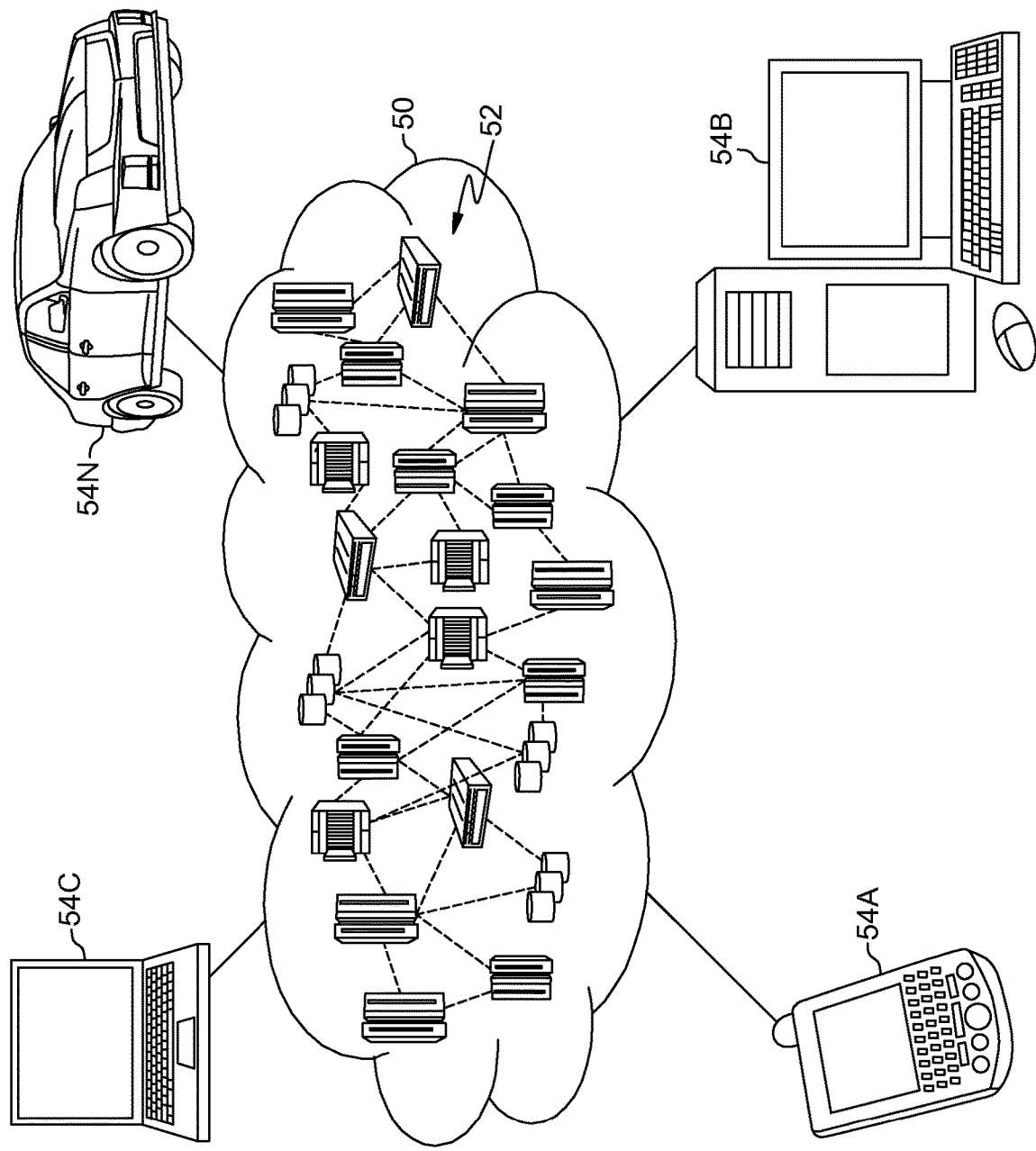
FIG. 7 depicts one embodiment of a cloud computing environment.

Referring now to FIG. 7, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 52 and cloud computing environment 50 can communicate with any type of computerized device over any type of network and/or network addressable connection (e.g., using a web browser).

Figure 8:
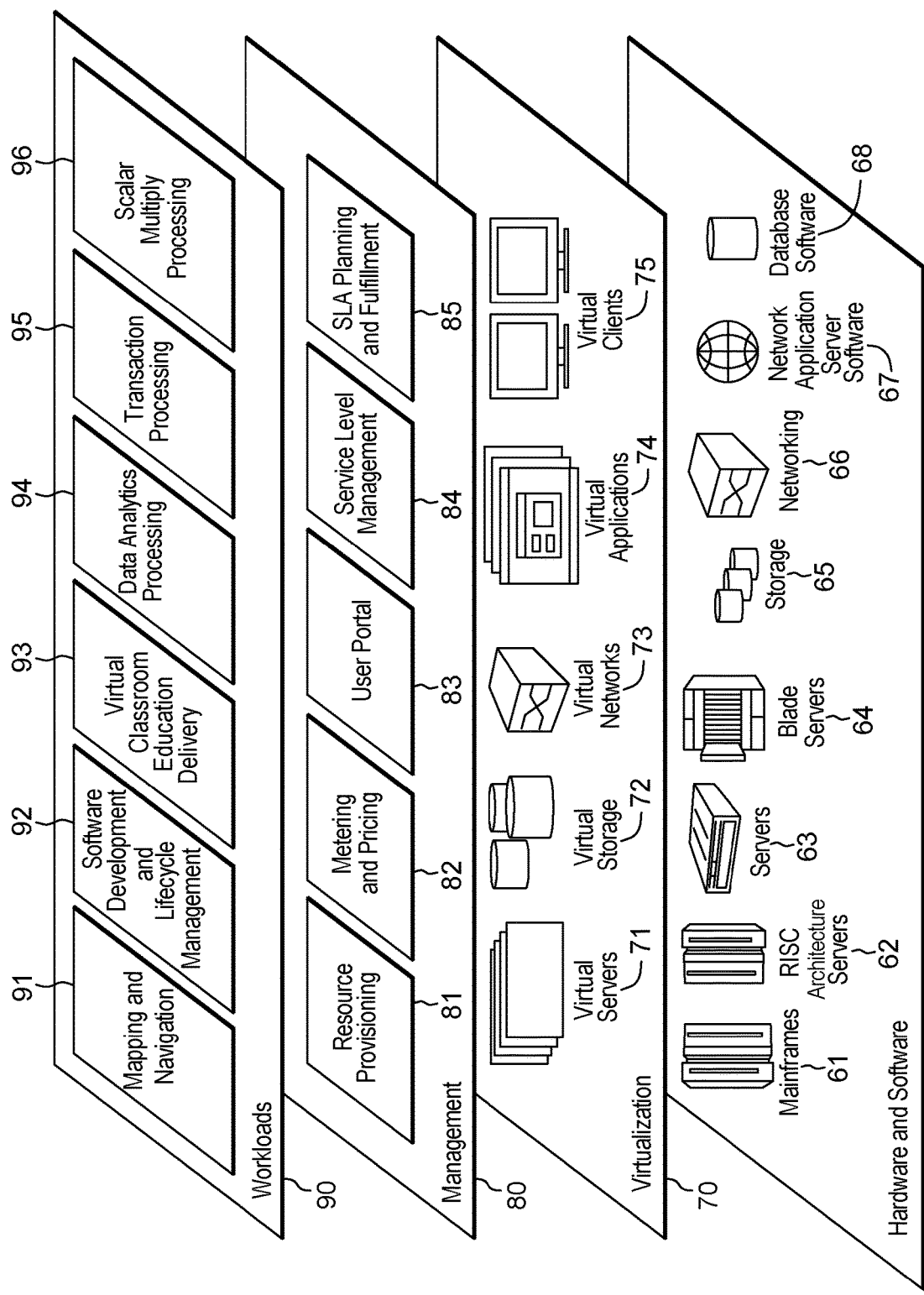
FIG. 8 depicts one example of abstraction model layers.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and scalar multiplication processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions or operations may be used. Additionally, different registers may be used and/or other types of cryptography algorithms. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   at least one computer readable storage medium readable by at least one processing circuit and storing instructions for performing a method comprising:
      obtaining an instruction, the instruction being a single architected instruction, the single architected instruction specifying a function code of a plurality of function codes supported by the single architected instruction, the plurality of function codes corresponding to a plurality of scalar multiply functions supported by the single architected instruction; and
      executing the instruction, the executing comprising:
         determining, based on the function code, a scalar multiply function of the plurality of scalar multiply functions supported by the instruction to be performed;
         obtaining input for the scalar multiply function to be performed, the input comprising at least one source component and a scalar value; and
         performing the scalar multiply function using the input to provide an output to be used in a cryptographic operation.

2. The computer program product of claim 1, wherein the performing the scalar multiply function comprises performing scalar multiplication of a point on an elliptic curve, the point specified by the at least one source component.

3. The computer program product of claim 2, wherein the point on the elliptic curve is specified by a first source component of the at least one source component and a second source component of the at least one source component, and wherein the first source component and the second source component are input to the instruction via a parameter block located using a register associated with the instruction.

4. The computer program product of claim 2, wherein the performing the scalar multiply function comprises performing a series of point additions and point doublings along the elliptic curve.

5. The computer program product of claim 1, wherein the performing the scalar multiply function comprises using the following equation: $(Xr, Yr) <= d*(Xs, Ys)$, wherein $Xs$ and $Ys$ are the at least one source component and are coordinates of a point on an elliptic curve, $d$ is the scalar value, $*$ is scalar multiply, and $Xr$ and $Yr$ are resulting coordinates of the scalar multiply function, the resulting coordinates being the output.

6. The computer program product of claim 5, wherein the d comprises a plurality of bits which are scanned from one bit to another bit.

7. The computer program product of claim 6, wherein the one bit is a most significant bit of d and the other bit is a least significant bit of d.

8. The computer program product of claim 6, wherein the performing the scalar multiply function further comprises for a bit of the plurality of bits of d equal to a select value, a point addition occurs, and after each bit is scanned, a point doubling occurs.

9. The computer program product of claim 1, wherein the plurality of scalar multiply functions comprises a plurality of scalar multiply functions for a plurality of elliptic curve digital signature algorithm functions for a plurality of primes.

10. The computer program product of claim 1, wherein the plurality of scalar multiply functions comprises a plurality of scalar multiply functions for a plurality of Edwards-curve digital signature algorithm functions for a plurality of primes.

11. A computer system for facilitating processing within a computing environment, the computer system comprising:
   a memory; and
   a processor coupled to the memory, wherein the computer system is configured to perform a method comprising:
      obtaining an instruction, the instruction being a single architected instruction, the single architected instruction specifying a function code of a plurality of function codes supported by the single architected instruction, the plurality of function codes corresponding to a plurality of scalar multiply functions supported by the single architected instruction; and
      executing the instruction, the executing comprising:
         determining, based on die function code, a scalar multiply function of the plurality of scalar multiply functions supported by the instruction to be performed;
         obtaining input for the scalar multiply function to be performed, the input comprising at least one source component and a scalar value; and
         performing the scalar multiply function using the input to provide an output to be used in a cryptographic operation.

12. The computer system of claim 11, wherein the performing the scalar multiply function comprises performing scalar multiplication of a point on an elliptic curve, the point specified by the at least one source component.

13. The computer system of claim 12, wherein the point on the elliptic curve is specified by a first source component of the at least one source component and a second source component of the at least one source component, and wherein the first source component and the second source component are input to the instruction via a parameter block located using a register associated with the instruction.

14. The computer system of claim 11, wherein the performing the scalar multiply function comprises using the following equation: $(Xr, Yr) <= d*(Xs, Ys)$, wherein $Xs$ and $Ys$ are the at least one source component and are coordinates of a point on an elliptic curve, d is the scalar value, * is scalar multiply, and Xr and Yr are resulting coordinates of the scalar multiply function, the resulting coordinates being the output.

15. The computer system of claim 14, wherein the d comprises a plurality of bits which are scanned from one bit to another bit, and wherein the performing the scalar multiply function further comprises for a bit of the plurality of bits of d equal to a select value, a point addition occurs, and after each bit is scanned, a point doubling occurs.

16. A computer-implemented method of facilitating processing within a computing environment, the computer-implemented method comprising:
  obtaining, by a processor, an instruction, the instruction being a single architected instruction, the single architected instruction specifying a function code of a plurality of function codes supported by the single architected instruction, the plurality of function codes corresponding to a plurality of scalar multiply functions supported by the single architected instruction; and
  executing the instruction, the executing comprising:
    determining, based on the function code, a scalar multiply function of the plurality of scalar multiply functions supported by the instruction to be performed;
    obtaining input for the scalar multiply function to be performed, the input comprising at least one source component and a scalar value; and
    performing the scalar multiply function using the input to provide an output to be used in a cryptographic operation.

17. The computer-implemented method of claim 16, wherein the performing the scalar multiply function comprises performing scalar multiplication of a point on an elliptic curve, the point specified by the at least one source component.

18. The computer-implemented method of claim 17, wherein the point on the elliptic curve is specified by a first source component of the at least one source component and a second source component of the at least one source component, and wherein the first source component and the second source component are input to the instruction via a parameter block located using a register associated with the instruction.

19. The computer-implemented method of claim 16, wherein the performing the scalar multiply function comprises using the following equation: $(Xr, Yr) \Leftarrow d*(Xs, Ys)$, wherein Xs and Ys are the at least one source component and are coordinates of a point on an elliptic curve, d is the scalar value, * is scalar multiply, and Xr and Yr are resulting coordinates of the scalar multiply function, the resulting coordinates being the output.

20. The computer-implemented method of claim 19, wherein the d comprises a plurality of bits which are scanned from one bit to another bit, and wherein the performing the scalar multiply function further comprises for a bit of the plurality of bits of d equal to a select value, a point addition occurs, and after each bit is scanned, a point doubling occurs.

* * * * *